United States Patent [19]
Jackson et al.

[11] Patent Number: 4,672,744
[45] Date of Patent: Jun. 16, 1987

[54] ROTARY TRIMMER

[76] Inventors: Richard L. Jackson, 7193 N. Preble County Line Rd., Lewisburg, Ohio 45338; Ansel N. John, 74 Benzell Dr., Centerville, Ohio 45459

[21] Appl. No.: 702,400

[22] Filed: Feb. 15, 1985

[51] Int. Cl.⁴ .............................................. B26B 7/00
[52] U.S. Cl. ...................................... 30/276; 56/16.6; 56/202; 56/295
[58] Field of Search .................... 30/276, 347; 56/295, 56/12.7, 16.6, 202, 13.4, 16.9

[56]  References Cited
U.S. PATENT DOCUMENTS

| 1,725,238 | 8/1929 | Williams | 144/133 R X |
| 1,871,606 | 8/1932 | Haddad | |
| 2,832,184 | 4/1958 | Beuerle | 30/276 X |
| 2,867,040 | 1/1959 | Mertesdorf | 30/205 |
| 3,030,854 | 8/1962 | Belker et al. | 30/276 |
| 3,672,139 | 6/1972 | Duran et al. | 56/16.9 X |
| 4,121,405 | 10/1978 | Wolf | 56/295 X |

FOREIGN PATENT DOCUMENTS

3246679  3/1984  Fed. Rep. of Germany ........ 56/295

Primary Examiner—Douglas D. Watts
Attorney, Agent, or Firm—Gustalo Nunez

[57]  ABSTRACT

A light weight portable hand-held apparatus for cutting and trimming vegetation, hedges, trees and the like and is provided with a rotatable blade housing have a plurality of cutting blades, said blades being square-shaped or U-shaped in configuration. A shroud designed for efficient transfer of cuttings and for providing protection from flying debris which may result by the cutting action of the blades. The cutting apparatus is provided with a receptacle for collecting the vegetation and branches after being cut and trimmed, said receptacle being designed for easy removal and for easy emptying. The blades used herein result in the cuttings being cut to a fine residue which increases the collecting capacity of the collection receptacle.

4 Claims, 13 Drawing Figures

ROTARY TRIMMER

BACKGROUND OF THE INVENTION WITH COLLECTION MEANS

This invention relates to an improved lightweight hand-held cutting apparatus for cutting and trimming vegetation such as hedges, bushes, tree branches and the like. The preferred embodiment is in the form of a double handled, lightweight hand-held rotary cutting device which is safe to the user and to those others who may be nearby. The cutting apparatus is provided with a collection bag for receiving the cut debris.

The prior art is profuse with attempts to provide a safe, reliable, portable cutting tool. Some prior art devices utilize reciprocating metal cutting blades and others use rotating metal and/or flexible cutting blades. Many of the prior art attempts display the disadvantage in that they are not as safe and efficient as the instant invention. The use of the prior art devices can be both laborious, time consuming and more importantly, unsafe.

U.S. Pat. No. 2,867,040 discloses a rotary hedge cutter which utilizies a plurality of individual cutting teeth, all of which rotate in the same plane. This type of device will at best cut vegetation and at worst, hack vegetation. It suffers the further disadvantage in that it is almost completely incapable of preventing cut debris from being discharged in a dangerous manner which could cause significant injury to persons in the area. Because of the design of the cutting teeth, the cut debris cannot be directed to a receiving chamber such as a bag. Also, the cut debris is not finely cut which requires the user to clean up the work area.

The comments set forth above can also be directed to the prior art device disclosed in U.S. Pat. No. 1,871,606. One difference being that this device does teach the use of cutting guides for separating the vegetation prior to cutting.

U.S. Pat. No. 3,050,854 also teaches a rotary hedge trimmer which utilizes a rotating blade of the type usually found in conventional lawnmowers. This invention also discloses the use of finger guides for separating the vegetation, but it too suffers from the same disadvantages set forth above. It does not finely cut the vegetation and cannot be used in a situation where the user would want to cause the cut debris to be delivered to a receiving container.

SUMMARY OF THE INVENTION

This invention is directed to a lightweight portable hand-held apparatus for trimming and cutting vegetation such as hedges, trees and the like. The preferred embodiment includes a blade housing member arranged for rotation about an axis which is generally perpendicular to the plane described by the rotating blade housing member. Attached to the rotatable blade housing member are a plurality of U-shaped blades which may also take the form of square-shaped blades. The rotatable blade housing member and blades are housed within a shroud or cover member designed for the efficient transfer of the cuttings from the inside chamber of the shroud to a collecting bag thereby, preventing debris from flying out of the apparatus after being cut which greatly increases the safety features of the apparatus.

It has been found that the U-shaped blades and square-shaped blades used with this invention are highly efficient cutting elements. In addition, the cutting apparatus is equipped with a comb or as otherwise referred to, feed fingers, which separate the vegetation into more manageable clumps or groups as the vegetation is being fed to the cutting blades. The rotatable blade housing also has affixed thereto air deflector fins which function to generate an aerodynamic air flow used to transmit the cut vegetation to a collecting bag attached to the cutting apparatus.

It has been found that one preferred cutting blade to use with this invention is a square-shaped blade. This is a blade that extends out from the blade housing and is bent at two 90° angles and is returned to the blade housing member. Another type of blade found to be satisfactory for use with the improved rotary trimmer is a U-shaped blade. This would be a blade which is connected to blade housing member at one end and extends out therefrom and at its outermost extremity is bent in a curvilinear configuration and is connected to the blade housing member with its other end. The preferred embodiment cuts the vegetation into fine pulverized debris which thus requires less space when placed in a collecting receptacle. This embodiment has been found to be excellent for cutting vegetation in both horizontal and vertical directions.

In its broadest concept, any type of motor can be used with the cutting apparatus, i.e., electric or fossil fuel motors may be employed. The type of motor will be determined by where the cutting apparatus will be used. For example, if the cutting apparatus is to be used in a residential area, an electric motor would be ideal and would also be quiet in operation. If the cutting apparatus is to be in areas where electricity is not available, gasoline motors, or battery packs could be utilized as the source of power for the rotary hedge trimmer.

A second embodiment of the cutting apparatus contemplated herein is one in which the cutting blade is affixed to a rotating cylinder at an askewed angle. The blade housing, which as mentioned previously is a rotating cylinder and is equipped with a comb which is generally in parallel alignment with the cutting blade. This cylindrical cutting blade is placed in a blade housing which is designed with feed fingers for uniformly separating the vegetation into more manageable cutting groups. This second embodiment has been found to be very desirable in cutting vegetation in a vertical direction.

It is a feature of both embodiments to provide safety features to minimize injury to the user. For example, deflectors may be provided to the cutting devices which shield the cutting blades when not in use. The cutting apparatus may be fabricated from a high impact type of material such as NYLATRON, DELRIN, or fiber glass impregnated plastic, the only requirement being that the material would be strong and lightweight. These and other features and advantages of the instant invention will become apparent from the following detailed description.

It can be seen that the prior art teaches devices which are capable of cutting and trimming hedges, vegetation and the like with some effectiveness. However, because of the construction involved and the type of blade used, the prior art devices are capable of causing injury to persons or pets who can be struck by flying debris exiting the prior art cutting devices; and also, the blades used in the prior art cannot be as effective as the cutting blade elements taught in the instant invention.

However, the applicant's design and debris catching means in combination with the applicant's cutting blades results in a vegetation cutting device which is highly efficient, highly economical, immensely safe, and which eliminates the need for any clean up of cut debris after the job is complete. The unique blades used in applicant's invention are so effective that when the cuttings exit the device, they are finely pulverized. Further the blades are completely encapsulated in a housing which does not inhibit or interfere with the cutting process but yet, which can prevent a finger or arm to engage the cutting blade.

DETAILED DESCRIPTION

Figure 1:
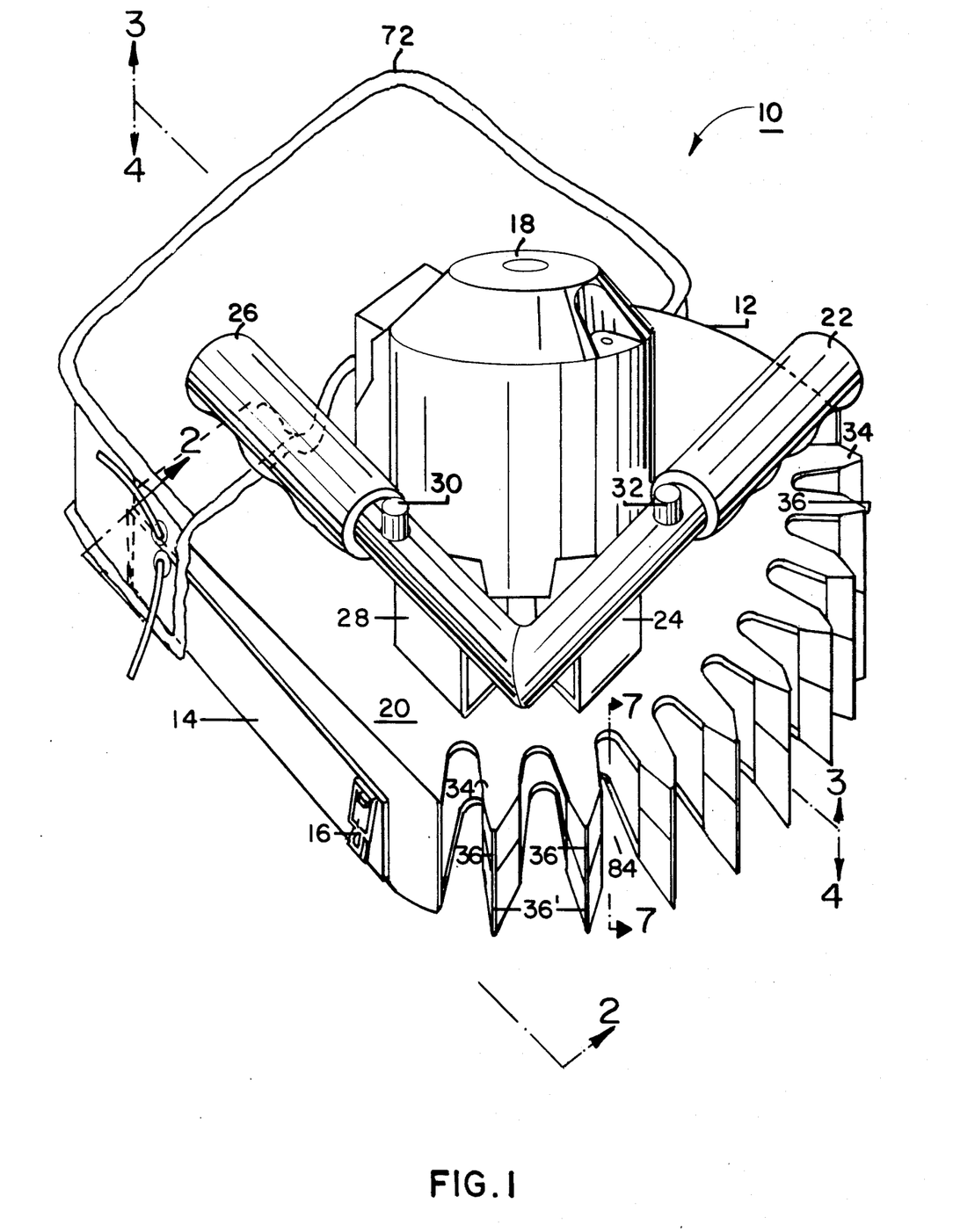
FIG. 1 is a front perspective view of one form of the cutting apparatus.
Figure 2:
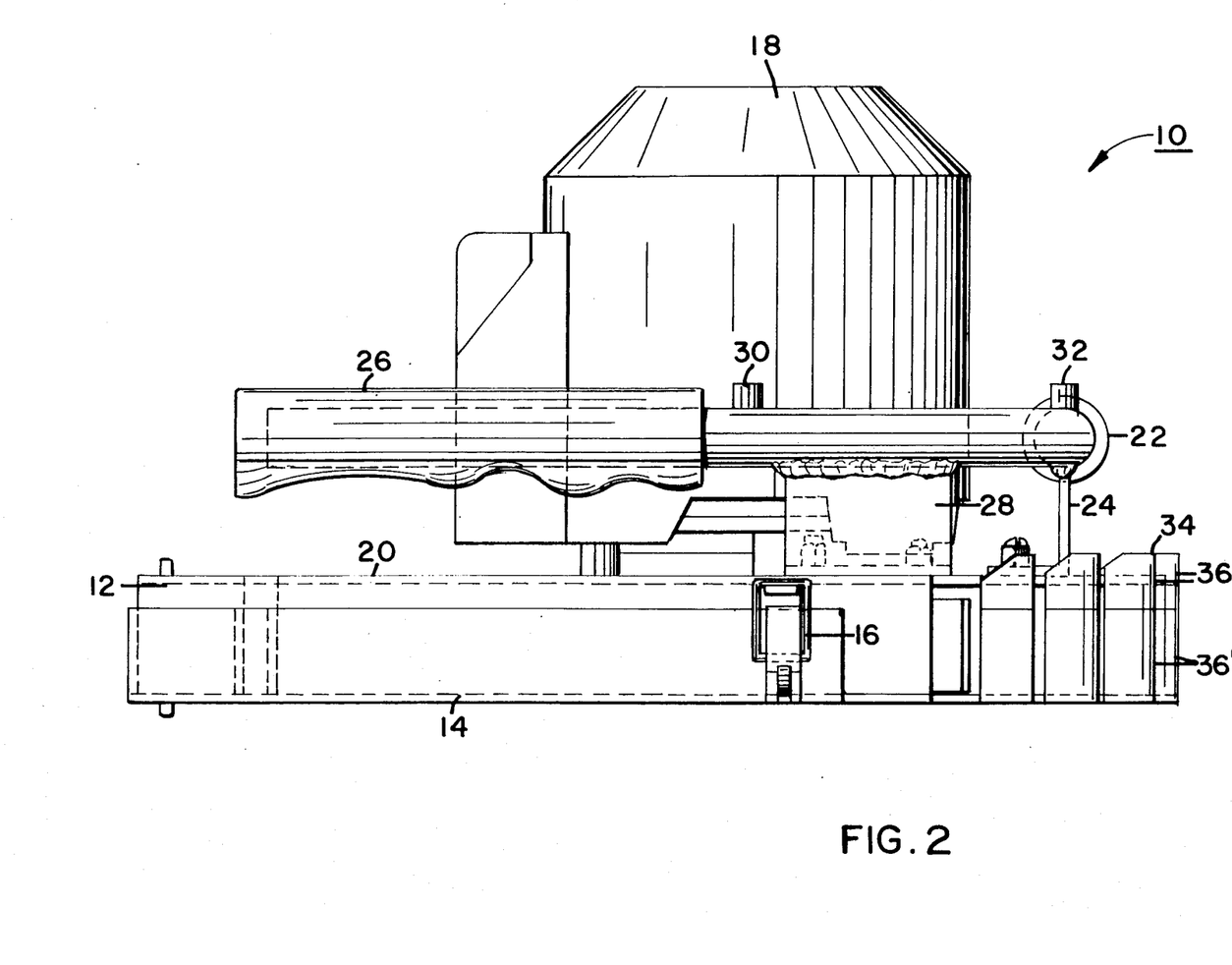
FIG. 2 is a side elevation view taken along lines 2—2 of FIG. 1.

In FIGS. 1 and 2, the numeral 10 general designates a rotary hedgecutter and includes a top or upper blade housing 12 and a bottom or lower blade housing 14 held integral to each other by connecting means 16 which may be conventional clips or other connecting means well-known to those skilled in the art. Power means such as an electric motor 18 is secured to the upper outside surface 20 of the blade housing 12. A pair of handles 22 and 26 are secured to the upper outside blade housing surface 20 by bracket means 24 and 28 respectively. Internal to the handles 22 and 26 are control wires (not shown) which provide a transmission path for the electrical power necessary to power the motor 18. Connected to the control wires (in series) two on/-off switches, 30 and 32, said switches being mounted on the handles 26 and 22 respectively. Electric power is furnished to the motor 18 by conventional means and said means are not a part of this invention.

Figures 3, 7:
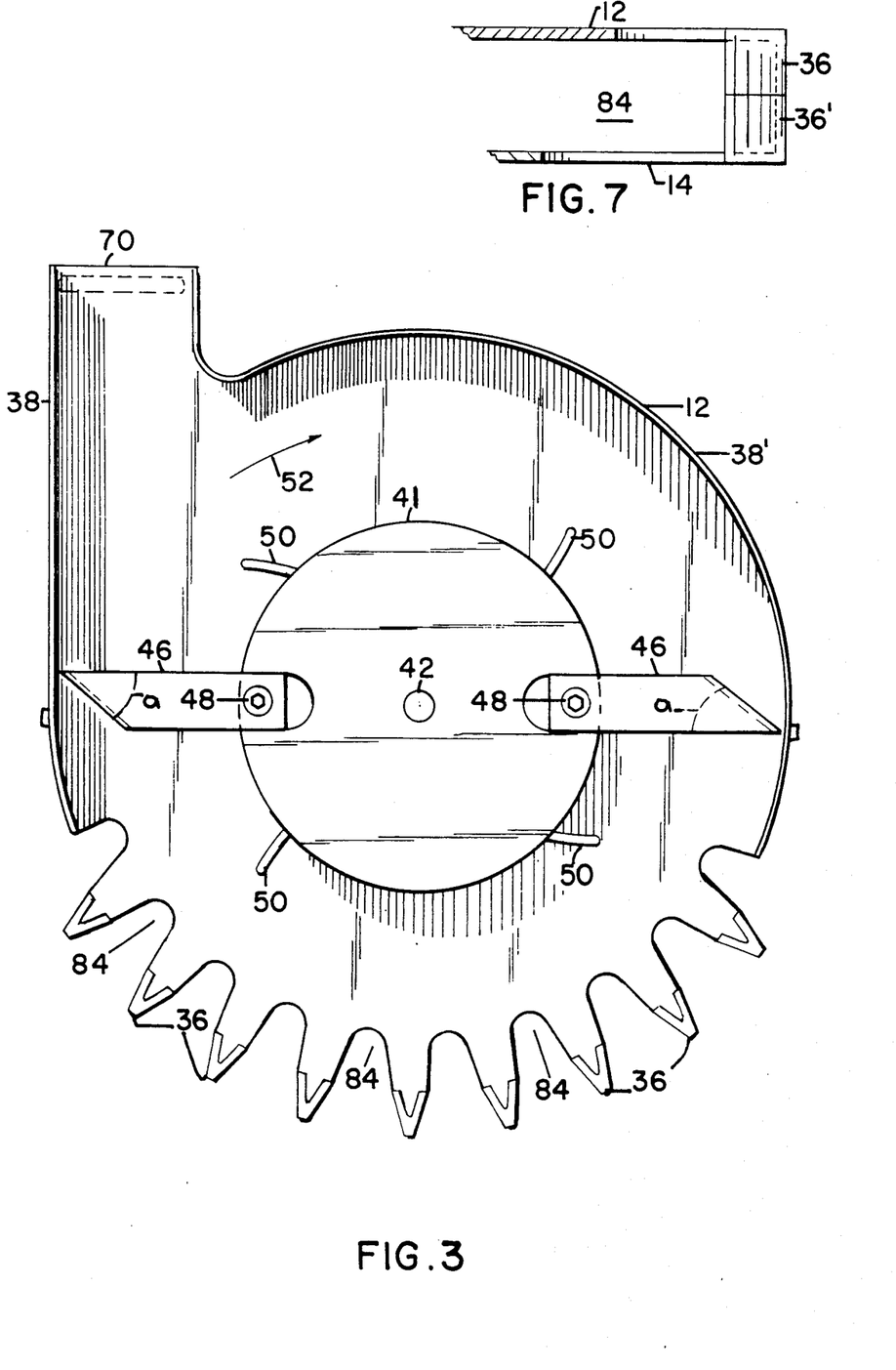
FIG. 3 is an elevation view taken along lines 3—3 of FIG. 1.
FIG. 7 is a side fragmentary elevation view of the extending fingers taken along lines 7—7 of FIG. 1.
Figure 12:
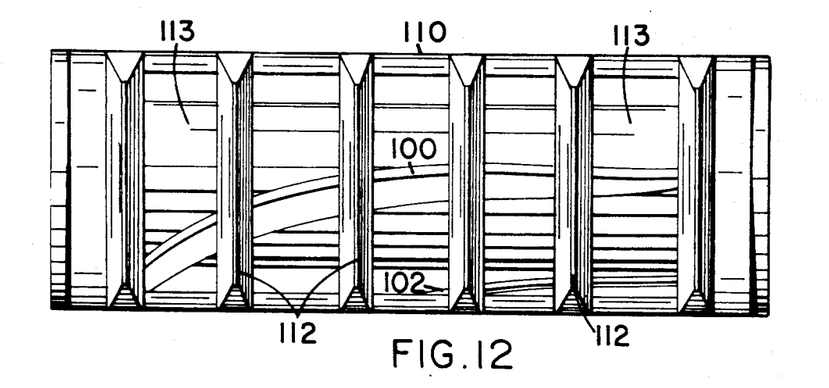
FIG. 12 is a front view of the apparatus shown in FIG. 11.

The upper blade housing 20 is provided at its forward end with a plurality of fingers or combs 34. These fingers 34 extend outwardly and taper to an apex 36. Referring to FIG. 7, the finger 34 located on the upper housing 12 is complementary to the finger located on the bottom housing 14. The upper housing 12, as mentioned previously, is detachably connected to the lower housing 14, and are complementary to each other, i.e., when connected, the housing members 12 and 14 make one exclusive chamber and the finger ends 36, 36' become one extending finger. The upper housing 12 is provided with side walls 38 and 38' and the bottom housing is provided with side walls 40 and 40' and the side walls 38 and 40 are complementary to each other thus making one exclusive chamber when the upper housing 12 and lower housing 14 are attached to each other.

Figure 5:
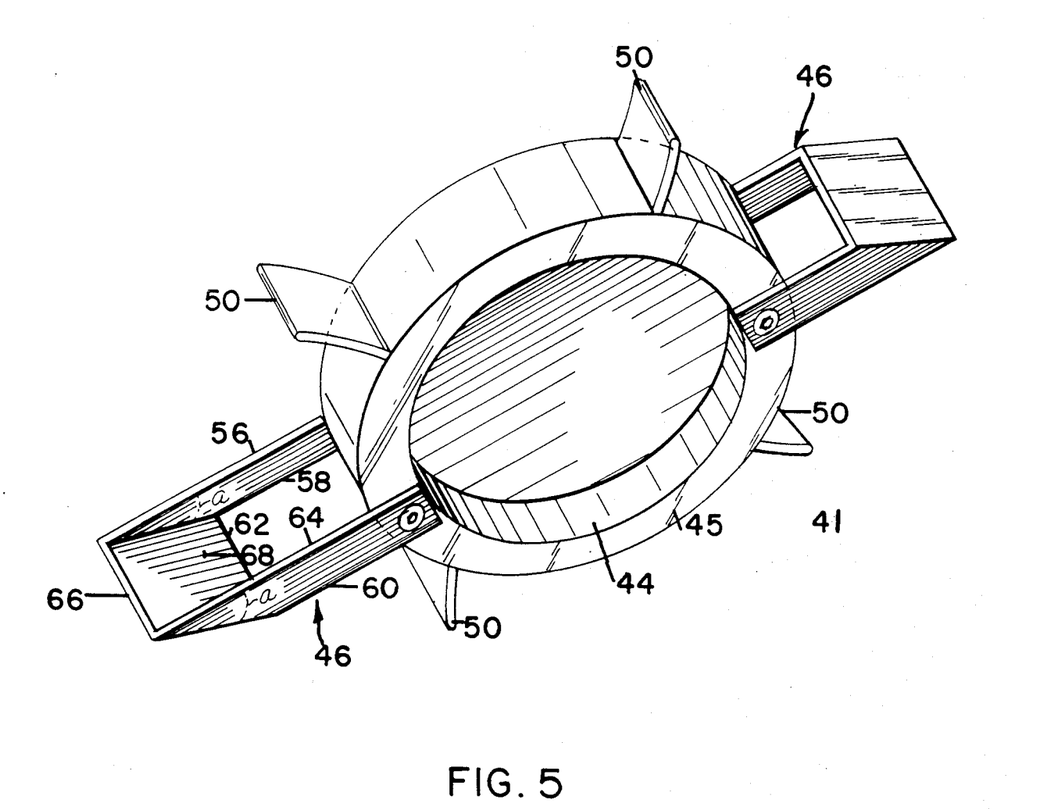
FIG. 5 is a front perspective view of the cutting blade and associated housing.

Referring to FIG. 3 there is shown a housing 41 which is mounted on to a motor shaft 42 by conventional bolts not shown because they do not go through the entire thickness of the housing 41. It can be seen that there are alternative methods of attaching the housing 41 to the shaft 42, eg. by having the housing threadedly connected to the shaft 42. Blade members 46 are affixed to the housing 41 by conventional mounting means 48. It is noted here that blades 46 can be made an integral part of the housing fabrication of the housing 41. In this manner, the user of the rotary trimmer could not remove the blades nor alter them without destroying the housing 41. This would keep the integrity of the blades 46 and housing 41 intact and thus increase the safety of the cutting apparatus 10. In short, this prevents the user from installing defective blades or modified blades. There are a plurality of air deflectors 50 integral to the housing 41, arcuate in configuration in the direction of the blade rotation shown by the arrow 52. The housing 41 may be manufactured from materials such as steel, plastics, or heavy rubber. In the event that an injection molded process is used in the manufacture of the blade housing, then in that event, the air deflectors 50 can be made as part of the housing 41. The cutting blade members 46 are unique and not known in the prior art. Referring to FIG. 5 the blade member 46 is manufactured with three cutting edges, i.e., top cutting edge 56, a side cutting edge 66 and a bottom cutting edge 64. As seen in FIG. 5, the blade cutting member is designed with an upper trailing edge 58, a side trailing edge 62 and a lower trailing edge 60. The longitudinal length of cutting edges 56 and 64 is greater than that of the trailing edges 58 and 60. Further the length of cutting edges 56 and 64 are identical and the length of trailing edges 58 and 60 are identical such than an angle "a" is defined by the cutting edge 56 and the terminating side member 68. Similarly, the same angle "a" is defined by the cutting edge 64 and the terminating side member 68. Thus, when viewing the cutting blade member 46 from the side, the terminating side areas of the cutting blade 46 extending away from the housing 41 are triangular in shape. Although three cutting edges are defined by the cutting member 46, there is defined but one contiguous cutting member 46.

Figure 6:
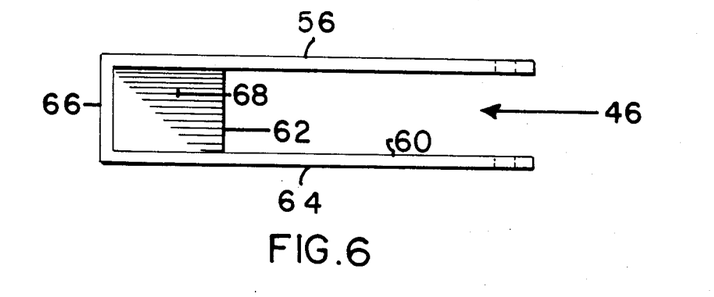
FIG. 6 is a side view of one cutting blade element.

Referring to FIG. 6, which is a side plan view of the cutting blade member 46, it can be seen that terminating side member 68 appears to be in the same plane as that of the cutting edges 56, 66 and 64. However, such is not the case because of the angle "a". Side member 68 is acutally sloped in the direction of rotation. In operation, the housing member 41 is rotating in the direction of the cutting edges 56, 66 and 64. Side member 68 functions as an air vane or air paddle and produces an air flow which impells any cut debris in a circular motion within the chamber formed by blade housing members 12 and 14. In conjunction with the terminating end members 68, air deflectors 50 act in tandem with the terminating end member 68 and thus strengthen the propelling force caused by the rotation of the housing 41. This force results in the debris being exited through a shute opening 70 formed by the combined combination of the blade housing members 12 and 14. It has been found that the cutting blade member 46 defined herein cuts the vegetation into a fine debris which lends itself well to being caught by some collecting means.

The reference number 72 defines a collection bag having an opening at 74. The bag 72 is constructed of a fabric material such as canvas, nylon or the like, the only requirement being that it be capable of breathing, i.e., allow the passage of air or capable of being provided with an air passage. As is well known the bag 72 may be attached to the hand trimming apparatus 10 by many conventional methods, and the method used herein is one of many. A velcro strip 76 is attached to the lower housing member 14 and its receiving counterpart is attached at 78 to the bag 72. Thus the bag 72 is secured to the lower housing 14 by the velcro. Also, the bag opening 74 is telescoped on to the shute opening 70 and held there by a draw string 80. A circular elastic band could very well be used to retain the bag 72 on to the opening 70. The bag is equipped zipper means 82 for evacuating the bag 72 of its contents.

Figure 4:
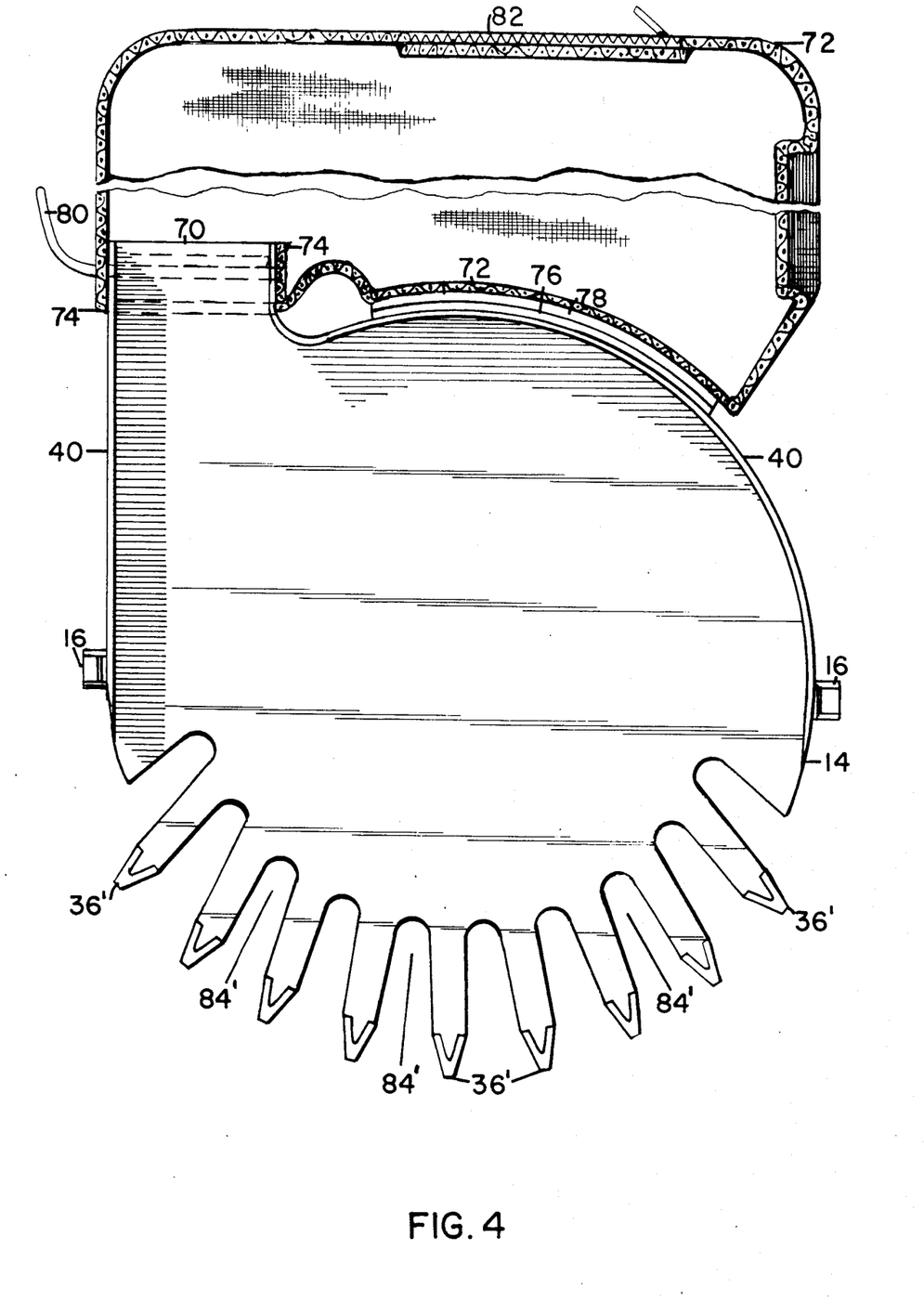
FIG. 4 is an elevation view taken along lines 4—4 of FIG. 1.

Referring to FIG. 4, it can be seen that the openings 84' which are on the lower housing 14 are recessed inwardly to a greater extent than those openings 84 which are on the upper housing. In operation, the apparatus 10 is directed into the vegetation to be cut, assume for purposes of this description, a hedge, the combs 34 separate the vegetation and this permits smaller segments of vegetation to be forced into the openings 84 and 84' as defined by the adjacent combs 34. The rotating blade member 46 extends outwardly into the area defined by the openings 84 and 84' and thus cuts all vegetation caught in the openings 84. The cut vegetation is then propelled into the collector bag 72. When the bag is full, the bag is simply emptied of its contents by opening the zipper 82 and disposing of the contents.

The apparatus 10 as described herein is excellent for cutting in either horizontal or vertical direction. It is lightweight and can be used by anyone. The use of the two on/off switches 30 and 32 requires the user to keep both hands on the handles 22 and 26 thus providing a safety feature. The apparatus 10 can also be provided with what is known in the trade as a "deadman's switch" which is a switch which must be held closed for the operation of the apparatus. If the switch is let go, the apparatus will stop.

The power means used to rotate the cutting blades in this embodiment have been electrical, however, it is obvious to these skilled in the direct that other power sources such as batteries or fossil fuel may be used.

Referring to FIG. 5, which discloses an enlarged view of the blade housing member 41, it can be seen that an open chamber 44 is defined by the side wall 45 of the housing member 41. When assembled, the member 41 will be buttingly engaged against the bottom wall surface of the upper housing 12. It has been found that an electrical motor can be placed in chamber 44 thereby decreasing the profile of the entire cutting apparatus 10.

Figures 8, 10:
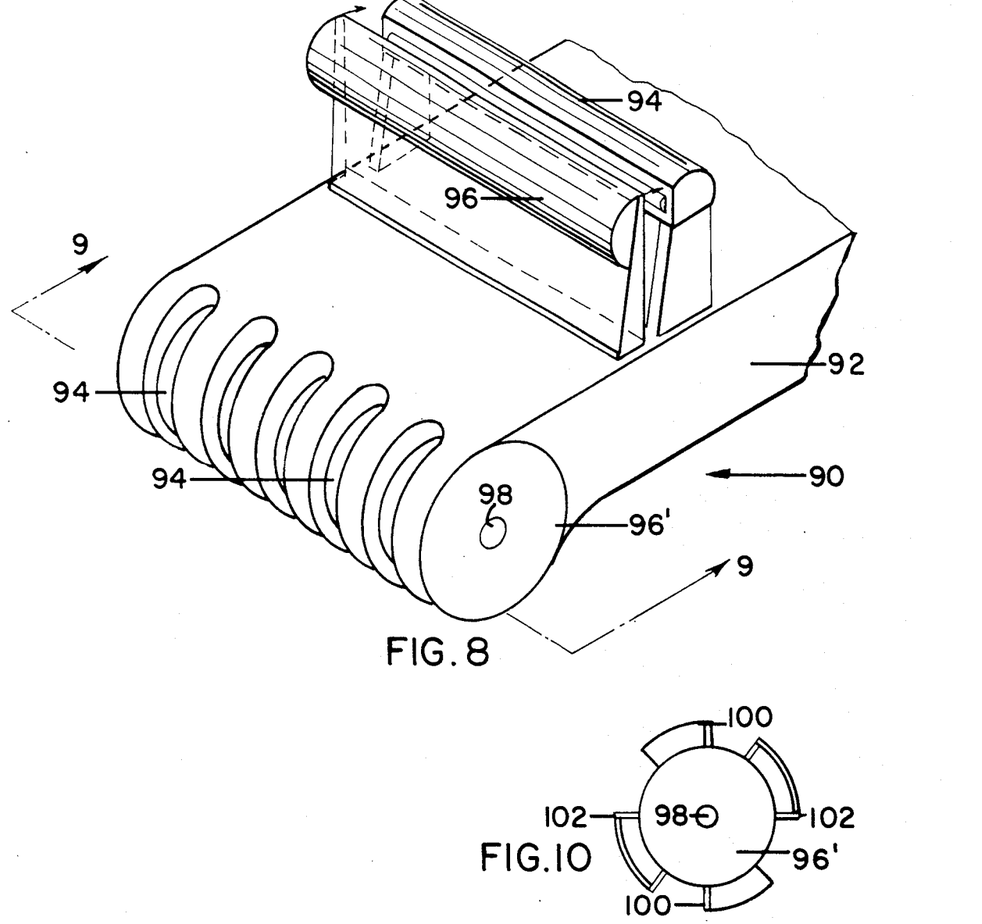
FIG. 8 is a frontal perspective view of yet another form of the cutting apparatus.
FIG. 10 is a side elevation view of the cutting blade shown in FIG. 9 and taken along lines 10—10.
Figure 9:
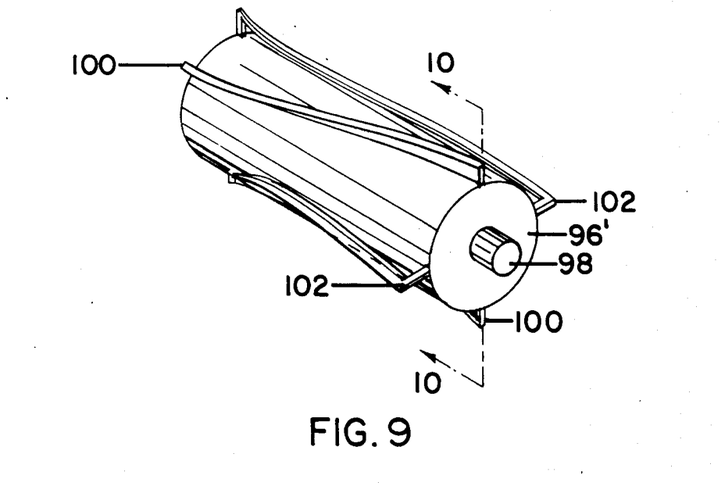
FIG. 9 is a perspective view of the cutting blade shown in FIG. 10.

In FIGS. 8, 9, and 10, a second embodiment of the invention is described. The reference number 90 generally describes a rotary hedge, vegetation trimmer. In this embodiment there is provided a housing 92 with split handles 94 and 96. Forward of the handles and a part of the housing 92, is a terminating curvilinear structure having a plurality of elongated parallel openings 94'. Located within the housing 90 is a cylindrical body member 96' having a rotating shaft member 98 at the center of said body member 96. Affixed to the body member 96' are a plurality of cutting blades 100. The cutting blades are placed on the body member 96' in a manner such that the blades 100 are askewed with respect to the axis of the body member 96'. Interspersed between adjacent cutting blade members 100 are bars 102 which are parallel to the blade members 100. The axis of rotation of the body member 96' is perpendicular with respect to the sides of the elongated openings 94.

Conventional power means such as an electric motor may be used to rotate the body member 96'. Split handle 94 and 96 are shown in this embodiment and are provided with electrical on/off switches (not shown) which are in a series with the power means to the motor. When the apparatus 90 is in use, it will be necessary to grip the handles 94 and 96 to make contact such that the electrical on/off switches complete the power circuit to the motor.

In operation, the bars 102 serve to separate the vegetation into smaller segments for cutting, thus preventing the apparatus 90 from jamming. The cutting bars then cut the vegetation off at the bottom of each elongated opening 94'. Collecting means for the cut debris maybe attached to this apparatus.

Figure 11:
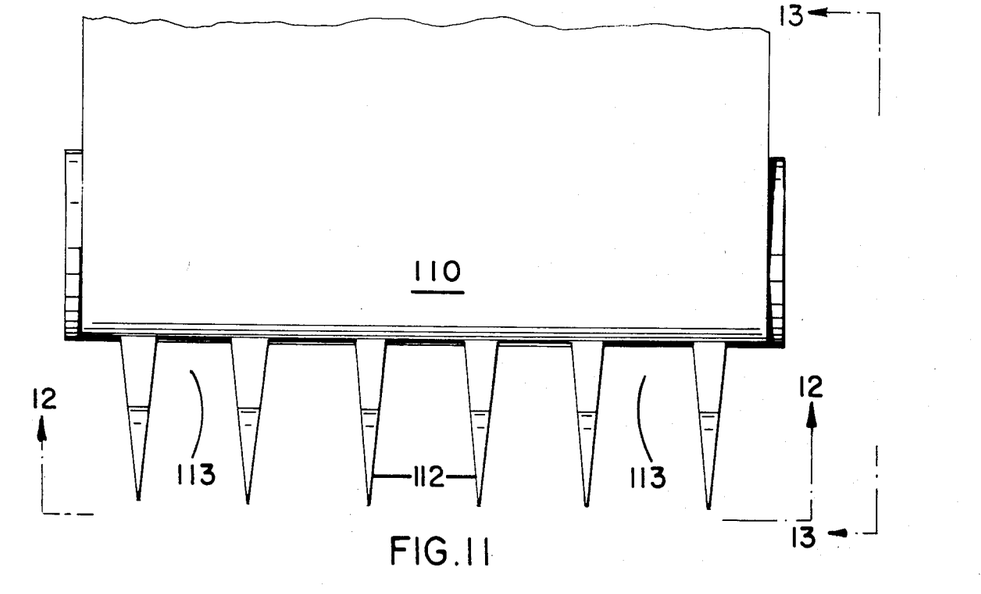
FIG. 11 is a front perspective view of yet another embodiment of the cutting apparatus.
Figure 13:
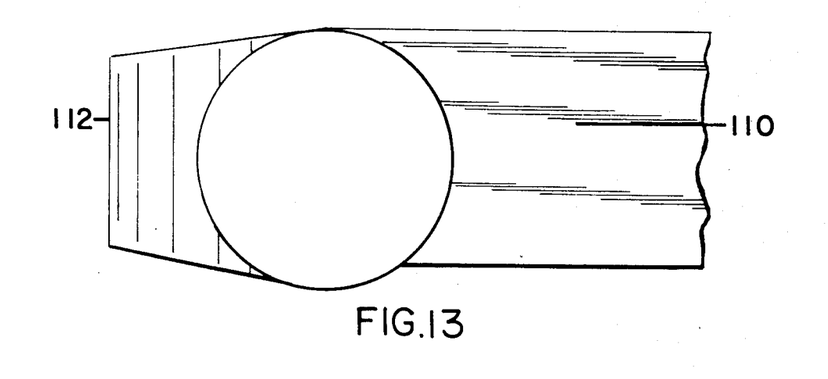
FIG. 13 is a side view of the apparatus shown in FIG. 11.

Referring now to FIGS. 11, 12 and 13, there is depicted at 110 a modified version of the cutting apparatus 90. It is noted that only the front cutting portion of the apparatus is shown. The front housing portion of the apparatus 110 includes a plurality of forward extending fingers 112. These fingers 112 define a plurality of elongated opening 113 and separate the vegetation in more manageable groups for cutting. The cutting elements is the same as the cutting element shown in FIGS. 9 and 10. The extending shaft is used to rotate the rotating cutting element.

The foregoing specification sets forth the invention in its preferred practical forms, but the structures shown are capable of modification within a range of equivalents without departing from the real spirit and purpose of our invention and it is our intention to cover by the appended claims, any modified forms of structure or use of mechanical equivalents which may be reasonably included within their scope.

What is claimed is:

1. In a rotatable device for cutting vegetation and the like, comprising:
   a rotatable blade housing member,
   a blade member mounted to said rotatable blade housing member in a plane generally parallel to a plane described by said rotatable blade housing member, said blade member having a plurality of cutting blade elements, wherein at least one of said cutting blade elements cutting in a plane essentially parallel to the plane described by said rotatable blade housing member and at least one cutting blade element cutting in a plane essentially perpendicular to the plane described by said rotatable housing member, said blade member further including an air impeller directing air in a direction described by said rotatable blade housing member,
   a guard member generally encapsulating said rotatable blade housing member and said blade member, said guard member having a plurality of openings at predetermined locations peripherally about said cutting blade elements, said guard member being provided with a plurality of forwardly radially extending projections for separating vegetation prior to said vegetation coming in contact with said cutting blade elements, said guard member being further provided with handle means and means for rotating said rotatable blade housing member, and a vegetation material collection member mounted on and made a part of said guard member, said airflow directing cut vegetation material to said collection member.

2. The apparatus described in claim 1 wherein said blade member comprises an elongated cutting blade having first and second terminating ends connected to said rotatable blade housing member thereby forming a plurality of distinct cutting blade elements angularly disposed with respect to each other.

3. In a rotatable device for cutting vegetation and the like, comprising:

motor means including an extending power driving shaft, a rotatable blade housing member mounted to said power driving shaft, a plurality of blade members having first and second terminating ends and in which said first terminating ends are connected to said rotatable blade housing member, said blade members each having a plurality of cutting blade elements and in which at least one of said cutting blade elements cutting in a plane essentially parallel to a plane described by said rotatable blade housing member, and in which at least one of said cutting blade elements cutting in a plane generally perpendicular to a plane described by said rotatable blade housing member, and in which each of said second terminating ends describes an angle < a with respect to a longitudinal axis described by each of said blade members and in which said blade members further include an impeller for moving air in the same rotational direction of said rotatable blade housing, a housing member adapted to receive said motor means, said rotatable blade housing member and said blade members, said housing member having a plurality of openings at predetermined locations peripherally about said cutting blade elements thereby permitting said cutting blade elements to cut said vegetation upon making contact with said vegetation material, said housing member being further provided with a plurality of outwardly extending projections separating vegetation material prior to said vegetation material making contact with said cutting blade elements, said housing member further including handle means for holding said device, and a vegetation collection member mounted on and made a part of said housing member, said collection member adapted to receive cut vegetation directed to said collection member by said airflow generated by said cutting blade element.

4. In a rotatable device for cutting vegetation and the like, comprising:

rotatable motor means including an extending power rotatable driving shaft, a rotatable blade housing member mounted to said power driving shaft, a plurality of blade members connected to said rotatable blade housing member at one end, said blade members each having a plurality of cutting blade elements, in which at least two of said cutting blade elements are essentially parallel to each other and describe a plurality of planes essentially parallel to a plane described by said rotatable blade housing member, each of said blade members further including at least one terminating cutting blade element affixed to at least two of said essentially parallel cutting blade elements at a predetermined distance from the end of each of said blade members connected to said rotatable blade housing member, wherein each of said terminating blade members describes a plane disposed at an angle < a with respect to a longitudinal axis described of each of said blade members, and wherein each of terminating cutting blade elements cutting in a plane essentially perpendicular to the plane described by said rotatable housing member, said blade member further including at least one air impeller directing air in a direction described by the rotation of said rotatable blade housing member, a housing member adapted to receive motor means, said rotatable blade housing member and said blade members, said housing member having a plurality of openings at predetermined locations peripherally about said cutting blade elements and describing a radius less than a radius described by said cutting blade elements thereby permitting said cutting blade elements to make contact with a vegetation material, said housing member further provided with a plurality of outwardly extending projections located adjacent each said opening thereby separating vegetation material prior to said vegetation material making contact with said cutting blade elements for cutting, said housing member further including handle means for holding said device, and a vegetation collection member mounted on and made a part of said housing member, said collection member adapted to receive cut vegetation directed to said collection member, through a passageway from the foremost part of said device to said vegetation collection member, by said airflow generated by said cutting blade element.

* * * * *